(12) United States Patent
Grifka et al.

(10) Patent No.: US 6,533,254 B1
(45) Date of Patent: Mar. 18, 2003

(54) CARBURETOR FUEL PUMP

(75) Inventors: Timothy K. Grifka, Ubly, MI (US); Bradley D. Hilbig, Rio Rico, AZ (US); Anthony M Kueffner, Frankenmuth, MI (US); Paul S. Learman, Bad Axe, MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/971,839

(22) Filed: Oct. 5, 2001

(51) Int. Cl.⁷ ................................ F02M 1/16
(52) U.S. Cl. ............... 261/35; 123/179.11; 137/846; 137/847; 261/DIG. 8
(58) Field of Search ............ 261/34.1, 35, DIG. 8; 137/846, 847; 123/179.11

(56) References Cited

U.S. PATENT DOCUMENTS

| | | | | |
|---|---|---|---|---|
| 1,952,437 A | * | 3/1934 | Huber | 215/309 |
| 3,275,305 A | * | 9/1966 | Nutten | 261/34.1 |
| 3,983,857 A | * | 10/1976 | O'Connor | 123/179.11 |
| 4,341,239 A | * | 7/1982 | Atkinson | 137/493 |
| 4,436,519 A | * | 3/1984 | O'Neill | 604/175 |
| 4,612,960 A | * | 9/1986 | Edwards et al. | 137/846 |
| 4,824,613 A | * | 4/1989 | Scott et al. | 261/35 |
| 4,926,808 A | * | 5/1990 | Kandler | 123/179.11 |
| 5,010,925 A | | 4/1991 | Atkinson et al. | 137/847 |
| 5,301,707 A | | 4/1994 | Hofsteenge | 137/12 |
| 5,507,318 A | | 4/1996 | Israelson | 137/854 |
| 5,711,901 A | | 1/1998 | Berg et al. | 261/35 |
| 6,374,810 B1 | * | 4/2002 | Pattullo | 123/516 |

FOREIGN PATENT DOCUMENTS

JP        1-151758      *  6/1989

* cited by examiner

Primary Examiner—Richard L. Chiesa
(74) Attorney, Agent, or Firm—Reising, Ethington, Barnes, Kisselle, Learman & McCulloch, P.C.

(57) ABSTRACT

A carburetor for a small internal combustion engine has a manual priming fuel pump with a resilient valve for allowing fuel flow in a first direction and for preventing fuel flow in a second direction. The resilient valve is reinforced with longitudinally extending ribs to prevent recirculation of fuel through an outlet orifice of the valve in a running engine. The outlet orifice is defined by a distal end of a tubular portion of the valve press fitted and projecting into an outlet passage that communicates with a pump chamber defined by a resilient domed cap. The ribs project laterally outward from the tubular portion within the outlet passage. Integral with an opposite end of the resilient valve is a head which flexes outward to open an inlet passage which then communicates with the pump chamber.

13 Claims, 2 Drawing Sheets

CARBURETOR FUEL PUMP

FIELD OF THE INVENTION

This invention relates to a carburetor fuel pump for small combustion engines and more particularly to a carburetor fuel priming pump having a duckbill dual check valve.

BACKGROUND OF THE INVENTION

Carburetors for small combustion engines are known to have manual priming pumps which expel unwanted air from fuel passages and chambers within the carburetor so that the engine may be easily started. The fuel priming pumps utilize a manually depressable domed cap which defines a pump chamber and a dual check valve which controls fuel and air flow from the carburetor and into a fuel tank of a non-running engine. When the dome is depressed against its own resilient force, an orifice of the valve is compelled to open to discharge air, vapor and/or liquid fuel from the pump chamber and preferably into the fuel tank. As the domed cap returns to its initial or unflexed natural state, the pump chamber is under vacuum causing the orifice within the outlet passage to close and a resilient annular member of the valve to flex outward to open an inlet passage.

When the engine is running, the inlet passage to the pump chamber preferably remains closed via the annular member, preventing unwanted recirculation of fuel from the carburetor to the fuel tank through the priming pump. It has been discovered that unfortunately, any vacuum or decrease in pressure created within the fuel tank during running conditions may cause the orifice of the dual check valve to oscillate open and closed. This oscillation can cause a decrease in the priming pump chamber pressure to a point where unwanted fuel leaks past the annular member from the inlet passage into the pump chamber and through the oscillating orifice. Such fuel leakage deprives the carburetor of needed fuel, causing erratic and unsteady running conditions of the engine.

SUMMARY OF THE INVENTION

A carburetor for a small internal combustion engine has a fuel priming pump with a resilient dual check valve allowing fuel flow in a first direction and preventing fuel flow in a second direction. The resilient dual check valve is reinforced with longitudinally extending ribs to prevent recirculation of fuel through an orifice of the valve in a running engine. The orifice is defined by a distal end of a tubular portion of the valve press fitted and projecting into an outlet passage that communicates with a pump chamber defined by a resilient domed cap. The ribs project laterally outward from the tubular portion within the outlet passage. Preferably an annular isolation member is engaged to an opposite end of the resilient valve. The isolation member flexes outward to open an inlet passage to communicate with the pump chamber.

By depressing a resilient domed cap, the volume is decreased and pressure is increased within the pump chamber causing the rib reinforced orifice to open expelling air and fuel from the chamber into the outlet passage. Upon release of the dome, it begins to return to its unflexed state which causes the chamber volume to increase thereby producing a vacuum draw or lower pressure relative to the pressure of the inlet passage. Consequently, the isolation member flexes outward during dome restoration and the orifice closes as a result of the rib bias and change in pressure differential. With the isolation member flexed outward, air, vapor and/or liquid fuel flows from the open inlet passage into the pump chamber. When the dome is fully extended, or in its unflexed natural state, the inlet passage and the outlet passage are closed and isolated from the pump chamber via the resilient dual check valve.

During engine running conditions, any vacuum or subatmospheric pressure created within the fuel tank and communicated through the outlet passage will cause a small negative pressure differential between the outlet passage and the higher pressure in the pump chamber. The orifice, however, will remain closed due to the bias of the reinforcement ribs preventing unwanted recirculation of air, vapor and fuel through pump chamber.

Objects, features and advantages of this invention include providing a priming pump with a resilient dual check valve capable of preventing unwanted air, fuel vapor and fuel flow through the priming fuel pump of a carburetor during engine running conditions, enhancing stability of a running engine, reducing exhaust emissions, and providing a dual check valve of relatively simple design, extremely low cost when mass produced, and which is rugged, durable, reliable, requires no maintenance or adjustment, and in service has a long useful life.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 1:
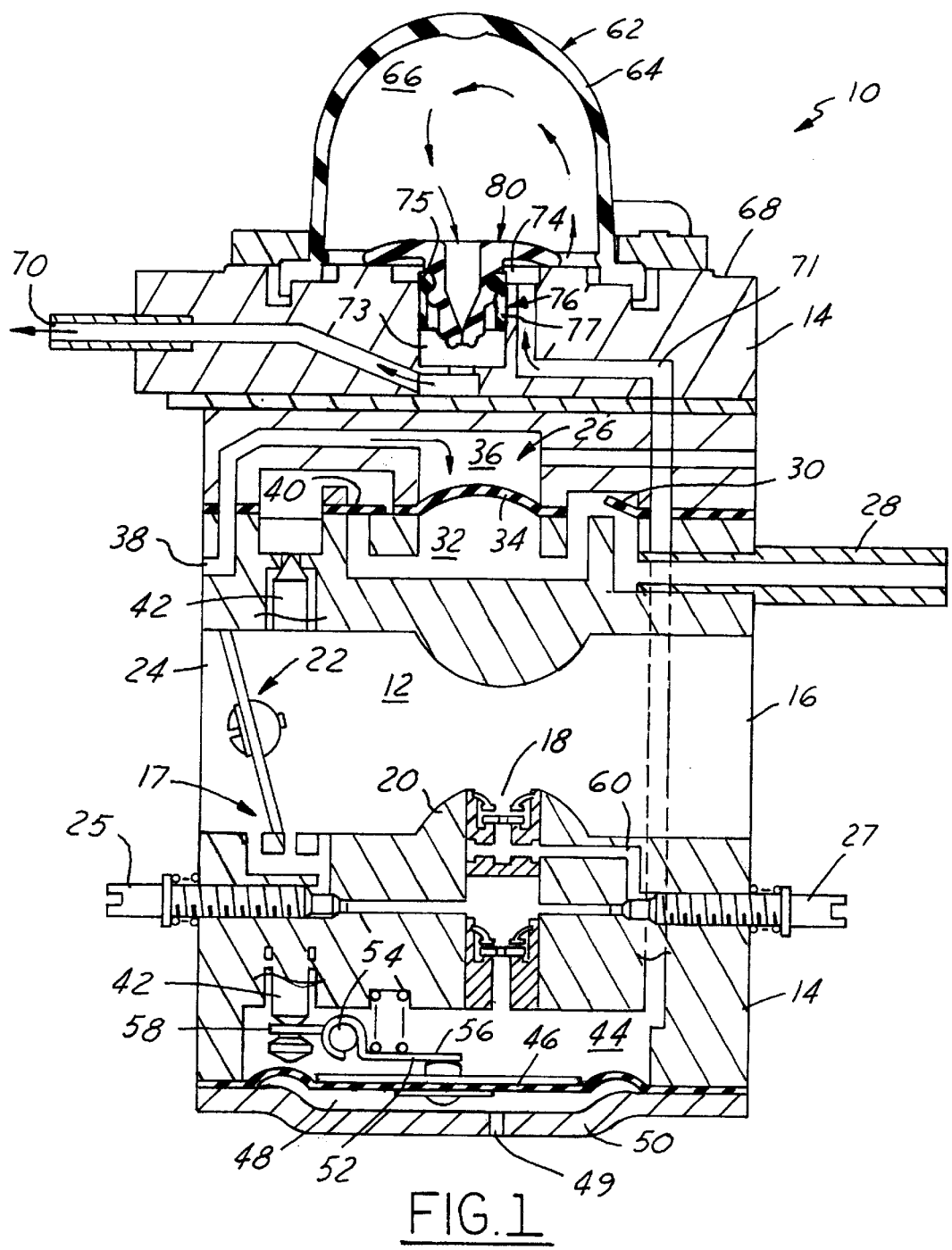
FIG. 1 is a cross section side view of a diaphragm type carburetor with a manual priming fuel pump of the present invention.
Figure 2:
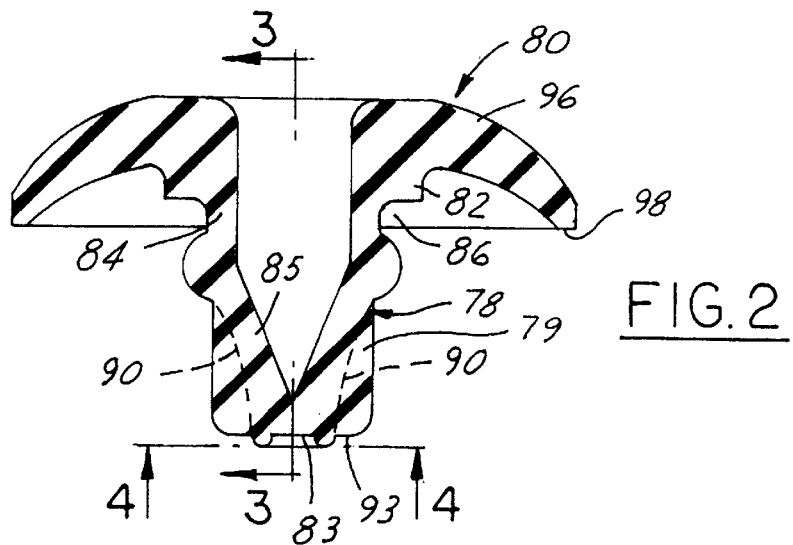
FIG. 2 is a perspective view of a dual check valve of the priming fuel pump.
Figure 3:
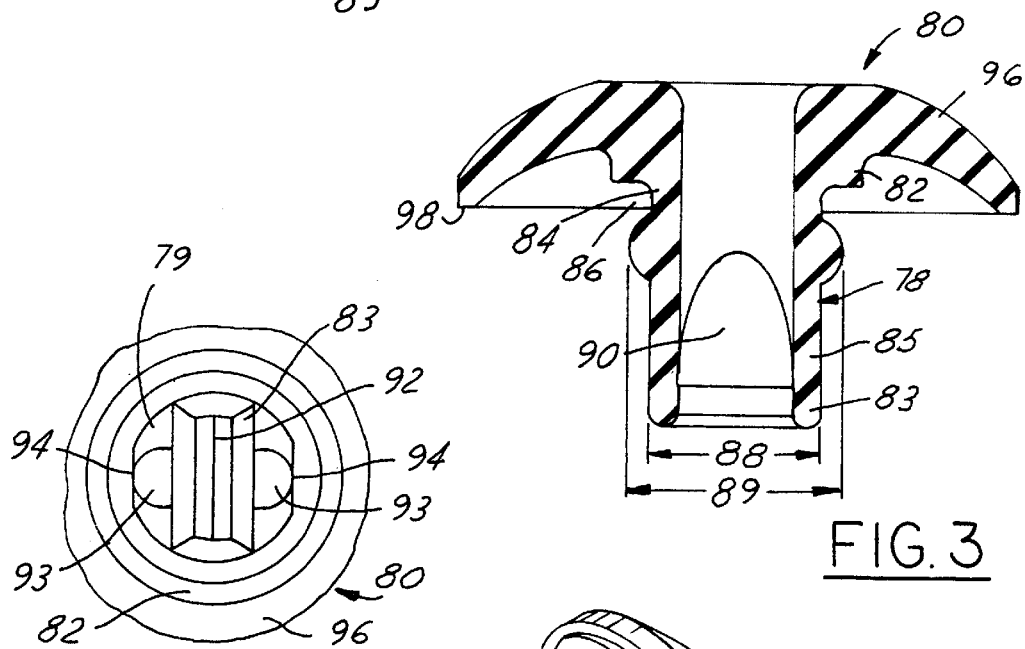
FIG. 3 is a cross section view of the dual check valve taken along line 3—3 of FIG. 2.
Figure 4:
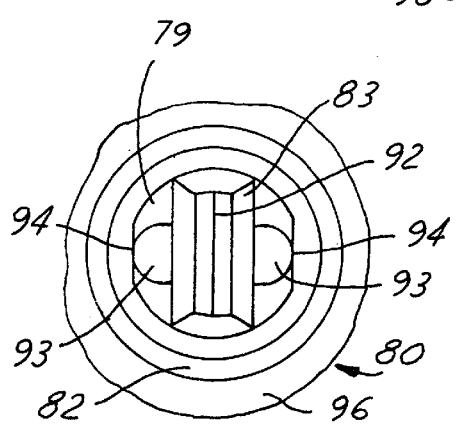
FIG. 4 is a fragmentary end view of the dual check valve taken on line 4—4 of FIG. 2.
Figure 5:
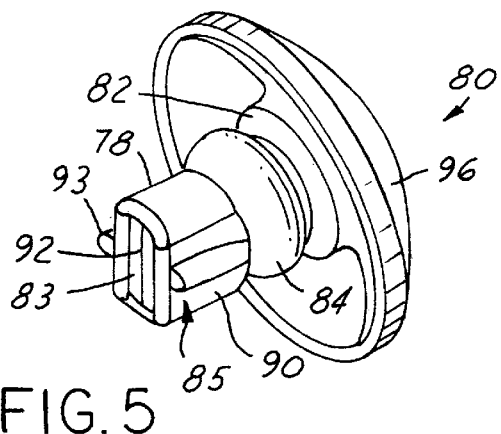
FIG. 5 is an isometric view of the dual check valve.

FIG. 1 illustrates a diaphragm carburetor 10 embodying the invention which is typically used for small two and four-cycle engine applications, however, the same principles can easily be applied in a float-type carburetor for either a two or four-stroke engine. Carburetor 10 has a fuel-and-air mixing passage 12 which is defined by and extends through a body 14 of the carburetor 10. Air at near atmospheric pressure flows through an inlet 16 of the passage 12 where it mixes with fuel from either an idle nozzle 17 located downstream from a throttle valve 22, or a main nozzle 18 located upstream from the throttle valve at a venturi 20 disposed within the passage 12 and defined by the body 14. The throttle valve 22 is positioned between an outlet 24 and the venturi 20 of the passage, and rotates therein to control the amount of a fuel-and-air mixture flowing to the engine through the outlet 24. The rate of fuel flow through the idle nozzle 17 is partially controlled by an idle or low speed flow control valve 25 during idle conditions and the fuel flow through the main nozzle 18 is controlled by a high speed flow control valve 27 during high engine speeds or high air flow conditions through the venturi 20.

A diaphragm type fuel pump 26, configured integrally within the body 14, receives fuel from a remote fuel reservoir or tank (not shown) which is connected to a fuel inlet nipple 28 projecting rigidly outward from the body 14. Fuel then flows through a check valve 30 within the body 14 and into a lower chamber 32 directly beneath a diaphragm 34 of the pump 26. The diaphragm 34 is compelled to flex into and out of the lower chamber 32 via pressure pulses generated by the engine and sent to an air chamber 36 of the pump 26 disposed directly above the diaphragm 34. Air chamber 36 is defined by the body 14 and receives the pressure pulses through a pulse inlet 38. Typically these pressure pulses are from the engine crankcase or the carburetor mixing passage 12.

The reciprocating or flexing movement of diaphragm 34 pumps the fuel through a second outlet check valve 40, to a control valve 42, and into a fuel metering chamber 44. Chamber 44 is defined by the body 14 and a second diaphragm 46 which flexes in order to hold the pressure within the metering chamber 44 substantially constant. In order to hold the metering chamber 44 to a constant pressure, the opposite or bottom side of second diaphragm 46 is exposed to a constant reference pressure, or atmospheric pressure. Protecting the diaphragm 46 is a cover plate 50 which engages the bottom end of the body 14 and surrounds the perimeter of the diaphragm 46 thereby forming an atmospheric chamber 48 there between which communicated with the atmosphere through a port 49.

In operation, fuel flows from the metering chamber 44 into the sub-atmospheric fuel-and-air mixing passage 12, the diaphragm 46 moves upward into the chamber 44 causing a first end 56 of a pivot arm 52, located within the metering chamber 44, to also move upward. The pivot arm 52 thereby pivots about a pivot point 54 causing an opposite second end 58 of the pivot arm 52, which is engaged pivotally to the flow control valve 42, to move downward thereby opening the valve. Fuel then flows into the metering chamber 44 until the diaphragm 46 lowers, essentially enlarging the fuel metering chamber 44, which in turn pivots the arm 52 and closes the valve 42. In this way, the fuel in metering chamber 44 is held at a substantially constant and near atmospheric pressure. Fuel is delivered from the metering chamber 44 to the main nozzle 18 via a main fuel channel 60 intersected by the high speed flow control valve 27. The fuel flow is created by the suction or difference between the pressure, typically at atmospheric, in the metering chamber and the sub-atmospheric pressure prevailing in the mixing passage 12 during normal operation when the throttle valve 22 is open.

Without cranking or running of the engine, the diaphragm pump 26 is deprived of the engine pressure pulses necessary to supply fuel from the reservoir into the metering chamber 44. Therefore, a manually operated suction or priming pump 62 is incorporated into the carburetor, to remove any air from the metering chamber 44 and/or the lower fuel chamber 32 of the fuel pump 26. The priming pump 62 has a domed cap 64 made of a resilient material such as, but not limited to polyurethane rubber which engages a valve seat 68 which is illustrated as an exterior surface of the carburetor body 14. However, the priming pump 62 can also be remotely mounted away from the carburetor body 14. The seat 68 and the domed cap 64 define a priming pump chamber 66 located generally there between and at the top of the body 14. Outlet and inlet passages 70, 71 communicate with the pump chamber 66 through respective outlet and inlet bores or ports 73, 74 defined in the seat 68. The outlet port 73 is disposed concentrically to the inlet port 74 which is substantially centered on the surface 68 within the pump chamber 66. Inlet port 74 is generally annular in shape having an outer perimeter defined by the seat 68 and an inner perimeter defined by an axial and radially-inward projecting end portion 75 of a seat ring 76 which is press fitted into the outlet port 73. Outlet port 73 is substantially enlarged with respect to the diameter of the remaining outlet passage 70.

Referring to FIGS. 1–5, the seat ring 76 concentrically surrounds a semi-tubular portion 78 of a duckbill or mushroom shaped dual check valve 80. The tubular portion 78 is disposed within the outlet bore 73, projecting downward into the bore from a radially enlarged annular portion 82 of the valve 80 to a distal end 83 of the semi-tubular portion 78. Portion 78 has a tubular engaging segment 84 attached unitarily to the annular portion 82 at one axial end and stepping radially down or inward to a converging segment 85 of the semi-tubular portion 78 at the opposite axial end. The engaging segment 84 has a substantially cylindrical outward surface which defines an outer circumferential groove 86 that sealably receives the radially inward projecting annular end portion 75 of the seat ring 76.

The seat ring 76 has a substantially tubular and cylindrical under portion 77 disposed concentrically and axially beneath the end portion 75. Under portion 77 is press fitted sealably into the outlet bore 73 and extends further into the outlet bore 73 than the more pliable engaging segment 84 of the dual check valve 80. The under portion 77 seals radially between the carburetor body 14 and a portion of the engaging segment 84 disposed beneath the groove 86. During assembly, engagement of the seat ring 76, via an interference fit, to the carburetor body 14 requires a greater force than engagement of the dual check valve 80 to the seat ring 76 because more surface area of the seat ring 76 is in contact with the carburetor body 14 than in contact with the dual check valve 80, or because the seat ring 76 is made of a harder material (such as plastic) than the resilient dual check valve 80. This assures the seat ring 76 remains in place when the dual check valve 80 is press fitted into the seat ring 76.

Referring to FIGS. 1 and 3–5, to achieve a seal, an inner diameter of the under portion 77 of the seat ring 76 is equal to, or slightly less than an outer diameter 89 of the engaging segment 84. To allow for radial expansion of the converging segment 85 when the dual check valve 80 opens, a semi-annular space 79 is defined radially and substantially concentrically between the under portion 77 of the seat ring 76 and the converging segment 85. The axial cross-section of semi-annular space 79 is most narrow and forms a true annular shape when measured at or near the engaging segment 84, defined between the outer diameter 89 and a smaller diameter 88 of the converging segment 85.

Two exterior, opposite facing, and slightly concave yet substantially planar faces 90 extend the axial length of the converging segment 85 and converge toward one-another from the engaging segment 84 to the distal end 83. The distal end 83 has an orifice or slit 92 disposed substantially parallel to the faces 90. Slit 92 is biased closed, but will open against the resilient force of the converging segment 85 when the pressure in the pump chamber 66 is adequately greater than the pressure within the outlet passage 70.

Reinforcing the converging segment 85 of the tubular portion 78 and projecting radially or laterally outward along the entire axial length of each face 90 is a longitudinal rib 93. Rib 93 has a distal edge 94 wherein the distance between the distal edges 94 of the two ribs 93 is substantially equal to diameter 88. The subsequent space 79 between the distal edge 94 of the longitudinal rib 93 and the seat ring 76 permits the diametrically opposed ribs to flex radially outward as the slit 92 opens against the resilient force of the ribs 93 due to an adequate pressure differential created across the converging segment 85 of the dual check valve 80 as the resilient domed cap 64 is manually depressed. The reinforcement longitudinal ribs 93 prevent unwanted fuel recirculation flow through the slit 92 due to minor pressure differentials created by changing pressure, or a vacuum, in the remote fuel tank.

A head 96 of the dual check valve 80 is engaged to the annular portion 82 of the tubular portion 78 and projects laterally or radially outward to encircle and cover or isolate the inlet port 74. Since the inlet port 74 is annular in shape and surrounds the outlet port 73, as previously discussed, the head 96 is preferably annular in shape and extends radially outward from the annular portion 82 to an outer perimeter edge 98 of the head 96 to operably cover and encircle the annular inlet port 74. As the head projects radially outward, it bends approximately ninety degrees so that the outer perimeter edge 98 faces and seals to the seat 68 when the pump chamber 66 pressure is greater than the inlet passage 71 pressure. The head 96 pivots or flexes outward away from the seat 68 causing the outer perimeter edge 98 to lift away from the seat 68 when the pump chamber 66 pressure is less than the inlet passage 71 pressure. This differential pressure condition exists after the depressed dome cap 64 has been released and is in the process of restoring itself to its unflexed natural domed state.

During manual operation of the priming pump 62, the dual check valve 80 of the priming pump 62 allows fuel flow in a first direction, as depicted by the arrows in FIG. 1, and prevents fuel flow in the reverse direction. When the resilient dome cap 66 is depressed, air, vapor and/or liquid fuel is expelled through the center and slit 92 of the check valve 80 and through the outlet passage 70. By depressing the resilient domed cap 64, the volume of the pump chamber 66 is decreased and pressure is increased causing the rib reinforced slit 92 to open expelling air, vapor and/or fuel from the chamber 66 into the outlet passage 70. Upon release of the flexed domed cap 64, the chamber 66 volume begins to increase causing a vacuum, draw, or low pressure relative to the pressure of the inlet passage 71. Consequently, the head 96 flexes outward during domed cap 64 restoration and the slit 92 closes as a result of the rib 93 bias and pressure differential. With the head 96 flexed outward, the inlet passage 71 is open causing air, vapor and/or fuel to flow from the metering chamber 44, through the inlet passage 71, and into the pump chamber 66, thereby removing any air or fuel vapor from the metering chamber 44 and the chamber 32 of the diaphragm pump. When the domed cap 64 is fully extended, or in its unflexed natural state, the inlet passage 71 and the outlet passage 70 are closed and isolated from the pump chamber 66 via the resilient dual check valve 80.

During operation or running of the engine, any vacuum or sub-atmospheric pressure created within the fuel tank and communicated through the outlet passage 70 will cause a pressure differential between the outlet passage 70 and the higher pressure in the pump chamber 66. The orifice 92, however, will remain closed due to the bias and resistance to flexing of the reinforcement ribs 93 preventing unwanted air fuel/air mixture and/or liquid fuel flow into the pump chamber 66 from the jets 17, 18 and/or fuel metering chamber 44.

While the forms of the invention herein disclosed constitute a presently preferred embodiment, many others are possible. For instance, the primary pump 62 including the dual check valve 80 can be remotely located from the carburetor with utilization of tubing or hoses to extend the necessary passages. It is not intended herein to mention all the possible equivalent forms or ramification of the invention. It is understood that terms used herein are merely descriptive, rather than limiting, and that various changes may be made without departing from the spirit or scope of the invention.

We claim:

1. A carburetor primer fuel pump for an internal combustion engine comprising:

a resilient valve having a head and an integral tubular portion having an engaging segment and a converging segment having a rib and a distal end having a self sealing orifice, the converging segment projecting and converging from the engaging segment to the distal end, the distal end defining the orifice, the rib extending longitudinally along and projecting laterally outward from the converging segment, and the head encircling and projecting radially outward of the tubular portion;

a seat body having an outlet port and an inlet port, the converging segment and distal end of the valve disposed in the outlet port, the engaging segment engaged sealably to the seat body, and the head encircling the inlet passage; and a resilient domed cap defining a pump chamber, the head and engaging segment of the valve disposed within the pump chamber, the inlet and outlet ports being in communication with the pump chamber through the valve.

2. The carburetor fuel pump set forth in claim 1 further comprising:

a carburetor body having the seat body;

an outlet passage carried by the carburetor body and communicating with the outlet port; and an inlet passage carried by the carburetor body and communicating with the inlet port.

3. The carburetor fuel pump set forth in claim 2 wherein the engaging segment is disposed between the head and the converging segment.

4. The carburetor fuel pump set forth in claim 3 wherein the engagement segment is sealably engaged to the carburetor body within the outlet port, and the converging segment is disposed within the outlet port.

5. The carburetor fuel pump set forth in claim 4 wherein the orifice is a linear slit and the rib is one of two opposing ribs both extending laterally outward in opposite directions.

6. The carburetor fuel pump set forth in claim 5 wherein the two opposing ribs each have a longitudinally extending distal edge spaced away from the carburetor body within the outlet port.

7. The carburetor fuel pump set forth in claim 2 further comprising the seat body being an exterior surface of the carburetor body, the domed cap engaged to the surface; and the resilient head projecting laterally outward from the engaging segment of the valve, the head having an outer perimeter edge constructed and arranged to normally engage the surface and flex away from the surface when the inlet passage pressure is greater than the chamber pressure, the inlet port of the inlet passage being normally encompassed by the perimeter edge.

8. The carburetor fuel pump set forth in claim 7 further comprising a seat ring engaged directly to the carburetor body within the outlet port, the seat ring projecting axially outward from the outlet port.

9. The carburetor fuel pump set forth in claim 8 wherein the inlet port is annular in shape and concentrically disposed about the outlet port, the inlet port being defined radially inwardly by the projecting seat ring and outwardly by the carburetor body.

10. The carburetor fuel pump set forth in claim 9 wherein the head is annular in shape and is disposed concentrically about the engaging segment o f the tubular portion, the outer perimeter of the head being in sealable contact with the surface of the carburetor body radially outward from the inlet port.

11. The carburetor fuel pump set forth in claim 10 wherein the seat ring has a radially inward projecting end portion received sealably in a groove defined by the engaging portion of the valve.

12. The carburetor fuel pump set forth in claim 1 wherein the orifice is a linear slit and the rib is one of two opposing ribs both extending laterally outward in opposite directions.

13. The carburetor fuel pump set forth in claim 12 wherein the converging segment has two opposite faces converging inwardly from the engaging segment to the distal end, and wherein one of the two opposing ribs project transversely from each face.

* * * * *